United States Patent [19]

Schlichenmaier et al.

[11] Patent Number: 5,278,488
[45] Date of Patent: Jan. 11, 1994

[54] PROCESS FOR IMPROVING THE CHARGE STATE OF A BATTERY ARRANGEMENT IN A MOTOR VEHICLE

[75] Inventors: Peter Schlichenmaier, Fellbach; Heinz-Georg Burghoff, Reichenbach, both of Fed. Rep. of Germany

[73] Assignee: Mercedes-Benz AG, Fed. Rep. of Germany

[21] Appl. No.: 788,800

[22] Filed: Nov. 5, 1991

[30] Foreign Application Priority Data

Nov. 7, 1990 [DE] Fed. Rep. of Germany ....... 4035337

[51] Int. Cl.⁵ ............................................... H02J 7/14
[52] U.S. Cl. ...................................... 322/28; 322/33; 320/64
[58] Field of Search ..................... 322/23, 24, 25, 28, 322/33, 34; 320/31, 32, 35, 36, 39, 40, 61, 64, 68

[56] References Cited

U.S. PATENT DOCUMENTS

| 4,220,908 | 9/1980 | Nicol | 322/33 |
| 4,398,140 | 8/1983 | Morishita | 322/34 X |
| 4,629,967 | 12/1986 | Voss | 322/28 |
| 4,659,977 | 4/1987 | Kissel et al. | 320/64 |

FOREIGN PATENT DOCUMENTS

| 0117468 | 9/1984 | European Pat. Off. |
| 0189885 | 8/1986 | European Pat. Off. |
| 0419867 | 8/1990 | European Pat. Off. |
| 1763315 | 10/1971 | Fed. Rep. of Germany |
| 2350494 | 4/1974 | Fed. Rep. of Germany |
| 2203200 | 5/1974 | France |
| 2084095 | 12/1991 | France |

OTHER PUBLICATIONS

Autoelektrik-"Car Electrics, Car Electronics in the Spark Ignition Engine", 1987, pp. 36-45.

*Primary Examiner*—Kristine L. Peckman
*Attorney, Agent, or Firm*—Evenson, McKeown, Edwards & Lenahan

[57] ABSTRACT

A process for improving the charge state of a motor vehicle battery arrangement having at least one battery and a generator driven by an internal combustion engine. Output power of the generator being at least partially utilized in order to charge the battery arrangement in the vehicle. The generator has an output voltage, which varies due to fluctuations in the speed of rotation of the internal combustion engine, and which is controlled so that it does not exceed a specific threshold value. Immediately after a starting process, at least under specific operating conditions, a raising of the specific threshold value $U_{limit}$ occurs during a specific period.

8 Claims, 2 Drawing Sheets

PROCESS FOR IMPROVING THE CHARGE STATE OF A BATTERY ARRANGEMENT IN A MOTOR VEHICLE

BACKGROUND AND SUMMARY OF THE INVENTION

The present invention relates to a process for improving the charge state of a battery arrangement in a motor vehicle.

A process of the generic type is disclosed in German Patent Document DE-OS 23 50 494, in which the charge value of a battery charge system of a motor vehicle is raised for a specific time after a net discharge, the net discharge being measured, preferably by measuring if the generator is operating at full power. A disadvantage of this arrangement lies in the degree of expenditure required to implement it.

Furthermore, a German Publication Autoelektrik, Autoelektornik am Ottomotor/Bosch [Car electrics, car electronics in the spark ignition engine/Bosch]; First edition; Düssedlorf: published by VDI, 1987, pp. 36–45, ISBN 3-18-419106-0) discloses a process according to which the output voltage of a generator driven by the internal combustion engine, which varies due to fluctuations in the speed of rotation of an internal combustion engine, is controlled so that the output voltage does not exceed a specific threshold value. This specific threshold value is temperature-dependent such that according to an example described there an output voltage of approximately 14.9 V is obtained at an ambient temperature of 250° K., and an output voltage of approximately 13.5 V at an ambient temperature of 370° K. Between these two points, the specific threshold value changes with the ambient temperature in an essentially linear fashion. Compensation of the ambient temperature can be carried out by balancing resistors.

In a different exemplary embodiment of a controller it is shown that electronic compensation of the ambient temperature can be achieved, thereby obtaining a higher charging current for charging a vehicle battery at low ambient temperatures. At higher ambient temperatures, only a lower charging current is required so that the specific threshold value also assumes a lower value. A disadvantage of the known process resides in the fact that the degree of discharging of the vehicle battery is inadequately accounted for.

The object of the present invention is to provide an improved process for charging the vehicle battery in which the degree of the previous discharging of the vehicle battery is taken into account as far as possible.

This object is achieved according to the invention, in which the discharging of a vehicle battery after starting an internal combustion engine (which is severe in comparison with the rate of discharge associated with other operating states) is allowed for by a rapid and efficient recharging. That is, immediately after a starting process, at least under specific operating conditions, the threshold value of the generator output voltage is raised for a specific period so that, as a function of the specific operating conditions, a higher charge voltage may be present at the terminals of the vehicle battery than actually corresponds to the momentary operating conditions (particularly the ambient temperature) in accordance with the state of the art.

One advantage of the invention over the known state of the art is that the discharging of the vehicle battery during a starting process is taken into account.

Other objects, advantages and novel features of the present invention will become apparent from the following detailed description of the invention when considered in conjunction with the accompanying drawings.

DETAILED DESCRIPTION OF THE DRAWINGS

Figure 1:
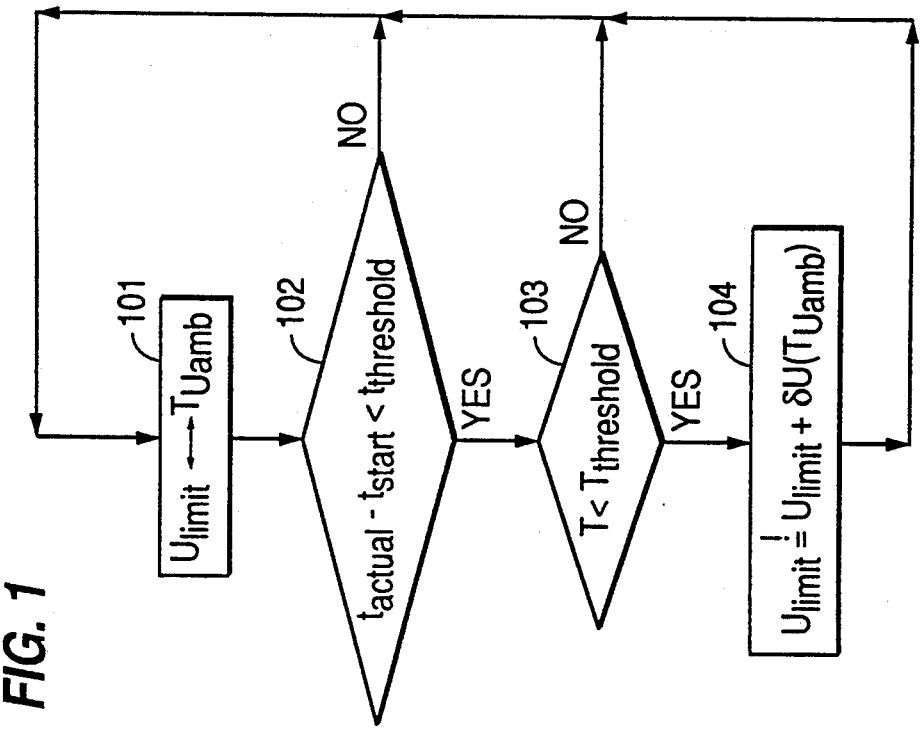
FIG. 1 shows a flow diagram of a first embodiment of a cycle of the process according to the invention.

As can be seen from FIG. 1, in step 101 in accordance with the state of the art a specific threshold value $U_{limit}$ is designated, which characterizes the maximum output voltage of the generator based on the ambient temperature $T_{amb}$.

In step 102 it is determined whether the time which has elapsed since the last starting process (at time $t_{start}$) exceeds a predetermined period $t_{thresh}$. If not, the process returns to step 101 and the process is repeated. In this manner it is ensured that during this initial period the charge voltage of the vehicle battery is increased by raising the specific threshold value $U_{limit}$, which leads to a particularly effective recharging of the vehicle battery after the starting process. This specific period $t_{thresh}$ can be on the order of magnitude of approximately one half hour.

In order to avoid overcharging the vehicle battery during frequent starting of the engine (such as, for example, during operation over short distances), in an advantageous embodiment in step 103 the internal combustion engine temperature (itself or a temperature T indicative of the internal combustion engine temperature) is monitored to determine whether it exceeds threshold value $T_{thresh}$. If so, it is only a matter of a brief interruption in driving and the process again returns to step 101. Overcharging of the vehicle battery can then be prevented by not raising the specific threshold value $U_{limit}$ in this case. An expedient order of magnitude for the value $T_{thresh}$ can be defined, for example, so that, on the basis of the temperature T that the internal combustion engine temperature is 320° K.

If it was determined during the testing in step 103 that the internal combustion engine temperature or the temperature T indicative of the internal combustion engine temperature lies below the threshold value $T_{thresh}$, the predetermined threshold value $U_{limit}$ is raised. This raising can be effected, for example, by adding a constant value $\delta U$ in a temperature-independent manner to the specific threshold value $U_{limit}$ resulting from the state of the art process. Likewise, the value $\delta U$ to be added can be varied as a function of the ambient temperature $T_{amb}$, the value $\delta U$ being smaller at lower ambient temperatures $T_{amb}$ than at higher ambient temperatures $T_{amb}$. A suitable order of magnitude for the value $\delta U$ then lies in the range of approximately 0.5 V.

The temperature T indicative of the internal combustion engine temperature may be supplied, for example, by a temperature sensor which measures the coolant temperature of the engine. However, it is also possible, by using a device for measuring the temperature, to match the specific threshold value $U_{limit}$ to the ambient temperature, thereby obtaining a threshold value $T_{thresh}$ for this temperature which is then indicative of internal combustion engine temperature. That is, by virtue of the known measures for compensation of the ambient temperature, a temperature signal which characterizes this ambient temperature is available in the generator controllers resulting from the previously known state of the art. Since the generator is located in the engine compartment of the vehicle, the ambient temperature bringing about this temperature signal is raised during operation due to the heat dissipated by the internal combustion engine, so that conclusions can also be made with respect to the temperature of the internal combustion engine from the ambient temperature represented by this temperature signal. A value for the temperature $T_{thresh}$ can then lie in the order of magnitude of approximately 350° K.

Figure 2:
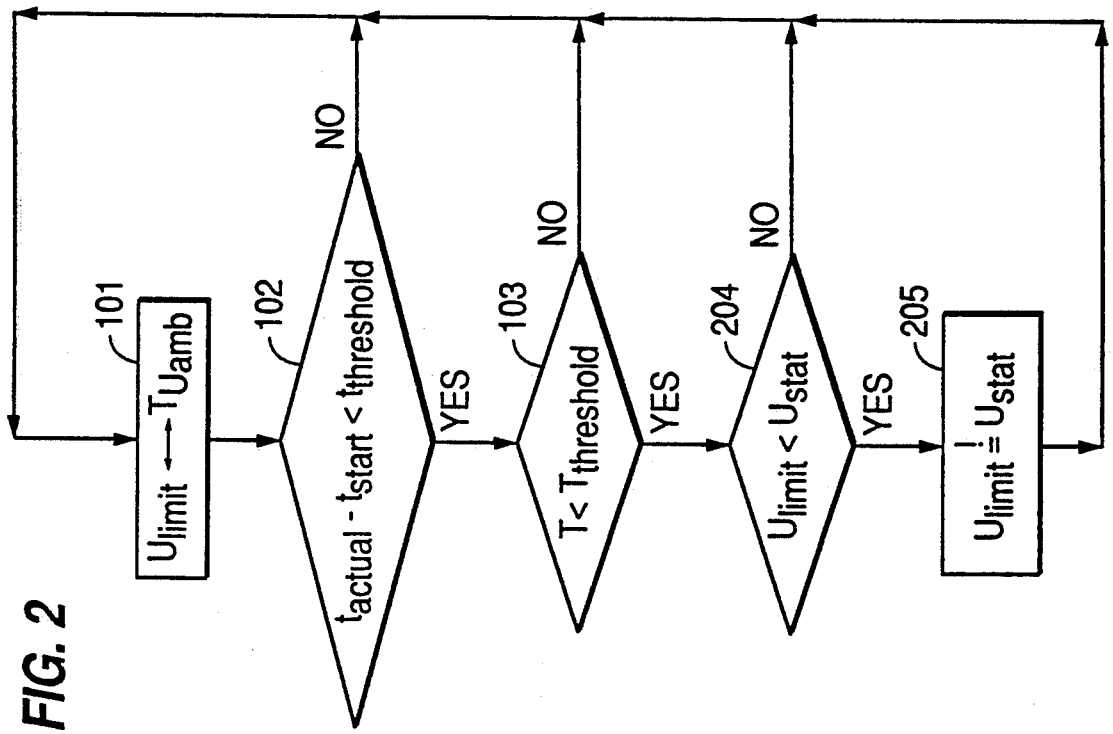
FIG. 2 shows a second embodiment of a cycle of the process according to the invention.

FIG. 2 shows a second embodiment of a cycle of the process according to the invention, in which steps 101 to 103 are identical to the embodiment described in FIG. 1. According to the embodiment in FIG. 2, the predetermined threshold value $U_{limit}$ should not fall below a specific value, so that above a specific ambient temperature $T_{amb}$ the specific threshold value $U_{limit}$ assumes a constant value $U_{stat}$, for example, on the order of magnitude of 14.5 V. Thus in step 204 it is determined whether the specific threshold value $U_{limit}$ obtained in accordance with step 101 is smaller than the constant value $U_{stat}$. If so, the specific threshold value $U_{limit}$ is set to the constant value $U_{stat}$ in accordance with step 205. Otherwise, the specific threshold value $U_{limit}$ continues to be valid for the control of the voltage.

Figure 3:
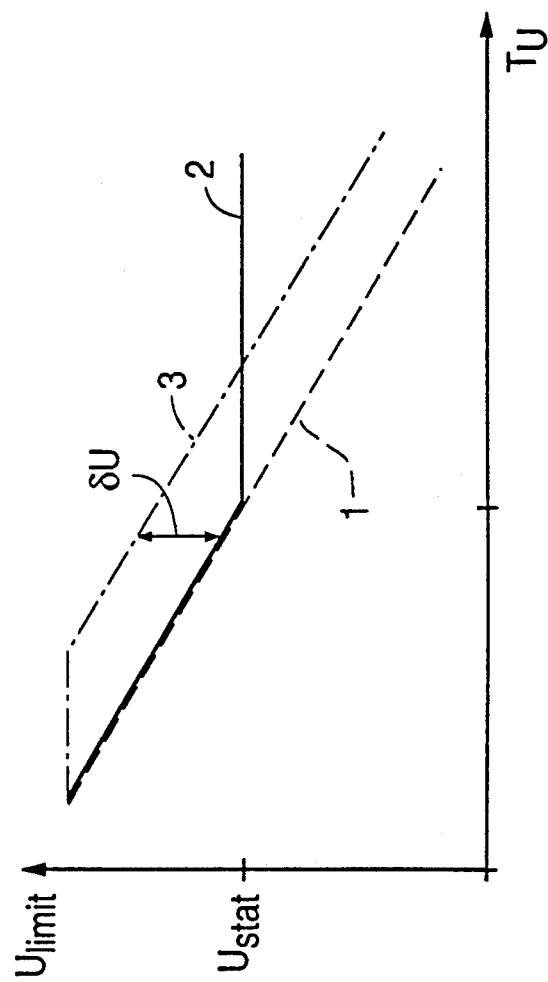
FIG. 3 illustrates the characteristics of the charge voltage against temperature in accordance with the embodiment in FIGS. 1 and 2.

In FIG. 3, the shape of different curves of the specific threshold value $U_{limit}$ is illustrated as a function of the ambient temperature $T_{amb}$. Curve 1 shows the variation of the specific threshold value $U_{limit}$ as a function of the ambient temperature $T_{amb}$ in accordance with the state of the art. Curve 2 shows the variation of the specific threshold value $U_{limit}$ in accordance with the exemplary embodiment in FIG. 2 and curve 3 shows the variation of the specific threshold value $U_{limit}$ in accordance with the exemplary embodiment in FIG. 1, an upper threshold value being simultaneously prescribed which the specific threshold value $U_{limit}$ does not exceed. It is in principle within the scope of the invention also to prescribe other variations of the specific threshold value $U_{limit}$ in order to raise the specific threshold value $U_{limit}$ as a function of the ambient temperature $T_{amb}$.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Process for improving the charge state of a battery arrangement in a motor vehicle of the type comprising at least one battery, and a generator driven by an internal combustion engine of said motor vehicle, output power of said generator being utilized at least partially to charge said battery arrangement in said motor vehicle, said generator having an output voltage which varies due to fluctuations in the speed of rotation of the internal combustion engine, and which is controlled so that it does not exceed a specific threshold voltage which is increased for a period as a function of discharging of the battery arrangement, said process comprising the step of:

raising said threshold voltage as a function of specific operating conditions during a specific period following a starting process;

wherein the raising of the specific threshold voltage is accomplished by adding an incremental value to the specific threshold voltage; and wherein the incremental value is varied with ambient temperature such that the incremental value is smaller at relatively lower ambient temperatures than at relatively higher ambient temperatures.

2. Process according to claim 1, wherein if the ambient temperature assumes a value such that, without a raising of the specific threshold voltage this specific threshold voltage would lie below a predetermined lower limit, said threshold voltage is set at said lower limit.

3. Process according to claim 1, wherein a lower value $U_{stat}$ is set below which the specific threshold voltage does not fall.

4. Process for improving the charge state of a battery arrangement in a motor vehicle of the type comprising at least one battery, and a generator driven by an internal combustion engine of said motor vehicle, output power of said generator being utilized at partially to charge said battery arrangement in said motor vehicle, said generator having an output voltage which varies due to fluctuations in the speed of rotation of the internal combustion engine, and which is controlled so that it does not exceed a specific threshold voltage which is increased for a period as a function of discharging of the battery arrangement, said process comprising the step:

raising said threshold voltage as a function of specific operating conditions during a specific period following a starting process;

wherein the raising of the specific threshold voltage is accomplished by adding an incremental value to the specific threshold voltage; and wherein said specific operating conditions are that if a temperature t indicative of temperature of the internal combustion engine exceeds a specific threshold temperature, the incremental value tends to approximate zero.

5. Process according to claim 4, wherein the specific threshold voltage is matched to ambient temperature.

6. Process according to claim 5, wherein if the ambient temperature assumes a value such that, without increasing the specific threshold voltage this specific threshold voltage would lie below a predetermined lower limit, said threshold voltage is set at said lower limit.

7. Process according to claim 5, wherein the incremental value is varied with the ambient temperature such that the incremental value is smaller at relatively lower ambient temperatures than at relatively higher ambient temperatures.

8. Process according to claim 4, wherein a lower value $U_{stat}$ is set below which the specific threshold voltage does not fall.

* * * * *